Patented Feb. 27, 1951

2,543,723

UNITED STATES PATENT OFFICE 2,543,723

STABILIZERS FOR DDT SOLUTIONS

John C. Hillyer and Charles W. Moberly, Bartlesville, Okla., assignors to Phillips Petroleum Company, a corporation of Delaware No Drawing. Application March 7, 1947,
Serial No. 733,184

6 Claims. (Cl. 167—42)

This invention relates to stabilized, concentrated solutions of DDT [2,2-bis (parachlorophenyl)-1,1,1-trichloroethane] and to methods and materials for their preparation. In one particular aspect it relates to methods for preventing the separation of insoluble precipitates from concentrated solutions of DDT under low temperature conditions.

The term DDT in general commercial usage and as used in this specification refers to the chemical compound 2,2-bis (parachlorophenyl)-1,1,1-trichloroethane. This compound is well known to be highly effective as an insecticide. It is described in U. S. Patent No. 2,329,074 to Muller, reissued as Reissue No. 22,700. Muller discloses the use of DDT in solution in alcohol, petroleum or similar solvents or in aqueous emulsion. He suggests solutions or emulsions containing about 5 per cent DDT. Siegler, in U. S. Patent 2,358,942 teaches the use of water or other compatible liquid in the preparation of emulsions of DDT having low concentration. It has become common practice to employ emulsions or solutions containing DDT in low concentration as insecticides.

The advantages of concentrated solutions for purposes of storage and transportation are obvious. Since the solvents necessary for dilution or emulsification prior to use are usually obtainable at the location of use at low cost it has become common commercial practice to manfacture DDT solutions having high concentration and to dilute such concentrates prior to use. Petroleum solvents are commonly used in the preparation of these concentrates. Almost any desired cut of petroleum products could be used as a solvent for DDT but those composed chiefly of paraffins are less desirable as the solubility of DDT is comparatively low in these materials. Fractions containing cyclics and aromatics are preferred, since DDT is more soluble in such materials.

One preferred solvent for preparing concentrated DDT solutions is a petroleum fraction known as gas oil and further characterized by boiling in the range from about 385° F. to about 550° F., having a flash point of not less than 125° F. and having an aniline point of not more than 25° F. Solutions containing from 25 to 30 per cent by weight of DDT are easily prepared by the use of such gas oil at ordinary room temperatures of about 60° to 80° F.

The solubility of DDT in petroleum solvents, as would be expected, becomes less as the temperature decreases. A serious disadvantage of concentrated DDT solutions arises from this fact, since low temperatures such as are often encountered in freight transportation in the winter or in storage in unheated warehouses often decrease the solubility of DDT enough to cause a considerable proportion thereof to precipitate from solution and such precipitated DDT does not readily dissolve again when the mixture is warmed to normal room temperatures. The observed phenomenon of precipitation of DDT in excess of the quantity required to form a saturated solution at low temperature is peculiar and distinctive in that a large quantity is not precipitated as soon as the saturation temperature is passed, or even after "seeding" by initial crystal formation occurs, but the precipitation is very slow and may continue over a great many hours. The reason why the resulting precipitate does not again dissolve upon warming the mixture to room temperature is not known, but is probably connected in some way with the slowness of its formation.

Whatever the cause may be, it is known that DDT does precipitate from concentrated solutions in petroleum solvents under the influence of cold and that the resulting precipitate is difficult to redissolve in the solvent. It is obvious that the insecticidal effect of a mixture of DDT solution and crystals will not be uniform and that crystals present therein may clog dispensing equipment such as spray nozzles. DDT solutions which are stable and which contain 25 to 30 per cent DDT are greatly desired in commerce. A method for maintaining DDT in solution at low temperatures or for causing precipitated DDT to be easily redissolved would be a great advance in the art.

It is an object of our invention to provide solutions of DDT in petroleum solvents which are stabilized against precipitation of DDT at low temperatures.

Another object is to provide additives for concentrated solutions of DDT in petroleum solvents which stabilize such solutions against precipitation of DDT at low temperatures.

Another object is to provide a method for decreasing precipitation of DDT from solution in petroleum solvents at low temperatures.

Another object is to provide a method for causing crystals of DDT, formed from solution in a petroleum solvent, to be easily soluble in said solvent.

Other objects and advantages will become apparent to those skilled in the art as this disclosure proceeds.

We have discovered that the addition of a minor proportion of sorbitan monolaurate, sorbitan monopalmitate, sorbitan monostearate or polyoxyalkene derivatives of these to a solution of DDT in a petroleum solvent results in a solution that is stabilized against precipitation of DDT at low temperatures—that is, the length of time such solution may be subjected to temperatures low enough to cause it to be supersaturated without separation of DDT crystals is greatly increased.

These sorbitan compounds are prepared commercially according to the process disclosed in U. S. Patent 2,380,166, issued July 10, 1045.

We have found these materials to be effective when used in concentrations varying from about 0.5 to 1.0 per cent by weight and they may be used in quantity sufficient to saturate the solution if desired. The quantity required to saturate the solution will vary from somewhat less than 1 per cent for some solvents to considerably more than 1 per cent for other solvents.

No special procedures are necessary for preparing such solutions. Any method which results in a petroleum solvent solution of DDT containing from 0.5 to 1.0 weight per cent or up to saturation of the solvent with such stabilizing material is satisfactory.

The mechanism by which sorbitan monolaurate, monopalmitate, monostearate or their polyoxyalkene derivatives stabilize supersaturated solutions of DDT is unknown but this property is exhibited by very few substances. Such materials as gelatin, casein, purified rosin, beeswax, acryloid resin, HF soluble oil, "Paraflow," a viscous oil made by condensation of chlorinated wax with an aromatic hydrocarbon, and "Santopour," a pour point depressant for lubricating oils; API gravity, 29.5°; flash point, 400° F.; pour point, 10° F.; viscosity, 60 Saybolt Universal seconds at 210° F., do not inhibit the separation of heavy insoluble precipitates in a relatively short time.

Our invention contemplates solutions of DDT in petroleum solvents generally, but its principal commercial application will be to concentrated solutions of DDT in petroleum solvents having high cyclic and/or aromatic content. One preferred application is to solutions containing from 25 to 30 weight per cent of DDT in a petroleum solvent boiling in the range from 385° F. to 550° F., having a flash point of not less than 125° F. and having an aniline point of not more than 25° F.

The following examples are given in order to illustrate the advantages gained in two particular embodiments of this invention. This invention, however, is not limited to the particular petroleum solvent shown in these examples, nor to the concentration of DDT shown therein, but it is limited only by the scope of the attached claims.

*Example I*

Solutions were prepared containing 30 weight per cent of technical grade DDT in a gas oil having the following specifications:

| | |
|---|---|
| Boiling range, °F. | 414–512 |
| Flash point, °F. | 193 |
| Kauri-butanol No. | 107.6 |
| Aniline No., °F. | 14.2 |
| Refractive index, 20° C. | 1.5376 |
| API gravity, 60° F. | 20.2 |
| Color (NPA) | 1½ |

A 10 cc. sample of such solution was placed in a ⅝" diameter glass test tube, lightly corked, and the test tube was suspended in a water-glycol bath maintained at −10° F.±1° F. A motor driven stirrer caused some vibration in the sample and the test tube was picked up for observation at intervals, when the solution was tipped back and forth in the tube. There was no other agitation while in the bath. This sample was clear when prepared at room temperature and remained clear for approximately 15 hours at −10° F. At the end of 16 hours at −10° F. a trace of crystalline material appeared. The quantity of crystalline material increased very slowly until approximately ½" of material had accumulated in the bottom of the test tube at the end of 88 hours. At the end of 160 hours at −10° F. crystalline material filled the entire volume occupied by the solution, and it was impossible to pour off the remaining solution. Since this crystalline material did not readily dissolve again when the mixture was warmed to room temperature it was evident that the usefulness of the solution had been greatly impaired.

*Example II*

To a 30 per cent solution of DDT, prepared as in Example I, 1.0 weight per cent of sorbitan monopalmitate was added. The resulting solution was slightly cloudy in appearance. A 10 cc. sample thereof was placed in a ⅝" test tube and was maintained at −10° F. in the manner shown in Example I. The cloudiness of this sample increased somewhat after the solution had been maintained at −10° F. for 100 hours although no precipitate formed during this period. After 100 hours a small amount of precipitate appeared and continued to slowly increase in volume until at the end of 144 hours the precipitate filled the bottom of the test tube to a depth of about ½".

*Example III*

To a 30 per cent solution of DDT prepared as described in Example I was added 1 per cent by weight of mixed polyoxyalkene derivatives of sorbitan monopalmitate. A 10 cc. sample of the resulting solution was placed in a ⅝" test tube and was maintained at −10° F. in the manner described in Example I. This sample was cloudy in appearance when freshly prepared and remained so, but no precipitate was formed until the sample had been maintained at −10° F. for 160 hours. At the end of this time a negligible trace of precipitate appeared in the bottom of the test tube.

Solutions prepared according to the process of this invention remain stable at the extremely low temperature of −10° F. for a period of 100 hours or longer. For practical purposes, therefore, such solutions are stable during periods of cold ordinarily occurring during transportation and storage. At temperatures somewhat above −10° F. the period of stability is greatly increased. The stabilizing materials of this invention are cheap and readily available. Concentrated solutions of DDT available heretofore, as illustrated in Example I, are not satisfactory for use in northern climates as such solutions may be permanently injured by being subjected to low temperatures for a period of one day or more.

We claim:

1. A nonaqueous insecticide solution comprising from 25 to 30 weight per cent of DDT, from 0.5 to 1 weight per cent of at least one stabilizing material selected from the group consisting of sorbitan monolaurate, sorbitan monopalmitate, sorbitan monostearate, and polyoxyalkene derivatives of such sorbitan esters, and a petroleum solvent characterized by boiling in the range from 385° F. to 550° F., having a flash point of not less than 125° F. and having an aniline point of not more than 25° F., said insecticide solution being more stable to precipitation of DDT therefrom at a temperature of −10° F. than a corresponding insecticide solution consisting of the same amount of DDT dissolved in the same petroleum solvent.

2. The nonaqueous solution of claim 1, in which the stabilizing material is sorbitan monopalmitate.

3. The nonaqueous solution of claim 1, in which the stabilizing material is a mixture of polyoxyalkene derivatives of sorbitan monopalmitate.

4. A nonaqueous insecticide solution comprising 30 weight per cent of DDT, one per cent by weight of mixed polyoxyalkene derivatives of sorbitan monopalmitate, and a petroleum solvent characterized by boiling in the range from 414° F. to 512° F., having a flash point of 193° F., a kauributanol No. of 107.6, an aniline No. of 14.2° F., a refractive index at 20° C. of 1.5376, an API gravity at 60° F. of 20.2, and a color (NPA) of 1½, said insecticide solution being more stable to precipitation of DDT therefrom at a temperature of −10° F. than a corresponding insecticide solution consisting of the same amount of DDT dissolved in the same petroleum solvent.

5. A nonaqueous solution comprising a petroleum solvent, an amount of DDT such that at −10° F. said solution is supersaturated with respect to DDT, and a stabilizing material in an amount not greater than 1 per cent by weight and sufficient to inhibit crystallization of DDT from said solution at −10° F., said stabilizing material being at least one selected from the group consisting of sorbitan monolaurate, sorbitan monopalmitate, sorbitan monostearate, and polyoxyalkene derivatives of said sorbitan esters.

6. The composition of claim 5 wherein said stabilizing material comprises a polyoxyalkene derivative of sorbitan monopalmitate.

JOHN C. HILLYER.
CHARLES W. MOBERLY.

REFERENCES CITED

The following references are of record in the file of this patent:

UNITED STATES PATENTS

| Number | Name | Date |
|---|---|---|
| 2,322,820 | Brown | June 29, 1943 |
| 2,448,665 | Fleck | Sept. 7, 1948 |

FOREIGN PATENTS

| Number | Country | Date |
|---|---|---|
| 547,871 | Great Britain | Sept. 15, 1942 |

OTHER REFERENCES

Martin et al: Annual Report of the Agricultural and Horticultural Research Station, Long Ashton, Bristol, 1944, page 125.

Madden et al.: Interim Report No. O-101 OSRD Insect Control Committee Report No. 97, Committee of Medical Research of the Office of Scientific Research and Development OEM cmr-M-4331, July 10, 1945, 5 pages.

Journal American Pharmaceutical Association, Practical Pharm Ed., Oct. 1945, page 263.

Oil, Paint and Drug Reporter and Drug Reporter, 1945, volume 147, No. 10, page 5, March 5, 1945.

Spans and Tweens Booklet, published by Atlas Powder Co., Nov. 24, 1942, pages 6, 7 and 8.

Wells: J. Econ. Entomology, volume 37, No. 1, Feb. 1944, page 137.

Fleck et al.: Industrial and Engineering Chemistry, volume 38, No. 2, February 1946, pages 177, 178.

Jones et al.: Soap and Sanitary Chemicals, November 1945, pages 110 to 115.